US010255307B2

(12) United States Patent
Mehrotra et al.

(10) Patent No.: US 10,255,307 B2
(45) Date of Patent: Apr. 9, 2019

(54) DATABASE OBJECT MANAGEMENT FOR A SHARED POOL OF CONFIGURABLE COMPUTING RESOURCES

(71) Applicant: International Business Machines Corporation, Armonk, NY (US)

(72) Inventors: Gaurav Mehrotra, Pune (IN); Harjindersingh G. Mistry, Bangalore (IN); Pratik P. Paingankar, Pune (IN); Nishant Sinha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 15/196,041

(22) Filed: Jun. 29, 2016

(65) Prior Publication Data
US 2018/0004783 A1   Jan. 4, 2018

(51) Int. Cl.
G06F 17/30 (2006.01)
G06F 17/22 (2006.01)

(52) U.S. Cl.
CPC .... *G06F 17/30306* (2013.01); *G06F 17/2264* (2013.01); *G06F 17/3056* (2013.01); *G06F 17/3087* (2013.01); *G06F 17/30289* (2013.01); *G06F 17/30442* (2013.01); *G06F 17/30557* (2013.01); *G06F 17/30575* (2013.01); *G06F 17/30607* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,788,285 | B2 * | 8/2010 | Rajamani | G06F 17/30286 |
| | | | | 707/791 |
| 7,979,477 | B2 * | 7/2011 | McCormack | G06F 17/30345 |
| | | | | 707/758 |
| 8,307,014 | B2 | 11/2012 | Mehrotra et al. | |
| 9,165,021 | B2 | 10/2015 | Bhattacharjee et al. | |
| 2002/0004796 | A1 * | 1/2002 | Vange | G06F 9/5027 |
| 2002/0023180 | A1 * | 2/2002 | Klimczak | G06F 3/0481 |
| | | | | 710/8 |
| 2005/0234934 | A1 * | 10/2005 | Mackay | G06F 17/30581 |
| 2006/0242107 | A1 * | 10/2006 | Chang | G06F 17/3056 |
| 2008/0217393 | A1 * | 9/2008 | Hempelmann | G06F 17/30557 |
| | | | | 235/375 |
| 2009/0012962 | A1 * | 1/2009 | Poyourow | G06F 17/30442 |
| 2009/0019057 | A1 * | 1/2009 | Hayashi | G06F 17/3087 |

(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.

*Primary Examiner* — Srirama Channavajjala
(74) *Attorney, Agent, or Firm* — Erik K. Johnson

(57) ABSTRACT

Disclosed aspects relate to database object management for a shared pool of configurable computing resources. A set of database object profile data is collected. The set of database object profile data is for a set of database objects. Based on the set of database object profile data, a set of database object priority values is determined. The set of database object priority values is for the set of database objects. Based on the set of database object priority values, a management action is performed. The management action is performed with respect to the set of database objects.

11 Claims, 9 Drawing Sheets

(56) References Cited

U.S. PATENT DOCUMENTS

| | | | |
|---|---|---|---|
| 2009/0132611 A1* | 5/2009 | Brown | G06F 17/30575 |
| 2010/0228788 A1* | 9/2010 | Eberlein | G06F 17/30351 |
| | | | 707/802 |
| 2010/0306288 A1 | 12/2010 | Stein et al. | |
| 2013/0262403 A1* | 10/2013 | Milousheff | G06F 17/30371 |
| | | | 707/691 |
| 2015/0066960 A1 | 3/2015 | Beck et al. | |
| 2017/0212924 A1* | 7/2017 | Semlani | G06F 17/30351 |

* cited by examiner

US 10,255,307 B2

DATABASE OBJECT MANAGEMENT FOR A SHARED POOL OF CONFIGURABLE COMPUTING RESOURCES

BACKGROUND

This disclosure relates generally to computer systems and, more particularly, relates to database object management for a shared pool of configurable computing resources. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to ranking database objects based on a plurality of parameters such as individual users who have authority to access the database objects, the frequency in which the database objects are updated, or the frequency in which the database objects are used for automatically placing or moving highly-ranked database objects to faster storage groups such as flash storage. As such, query performance or efficiency may benefit. Features may relate to authorization types on a database object, how the database object is defined in schema, or how often it is accessed in order to to derive a rank for the database objects. In addition, statistics may be captured for database objects in correspondence with the ranking.

Disclosed aspects relate to database object management for a shared pool of configurable computing resources. A set of database object profile data is collected. The set of database object profile data is for a set of database objects. Based on the set of database object profile data, a set of database object priority values is determined. The set of database object priority values is for the set of database objects. Based on the set of database object priority values, a management action is performed. The management action is performed with respect to the set of database objects.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
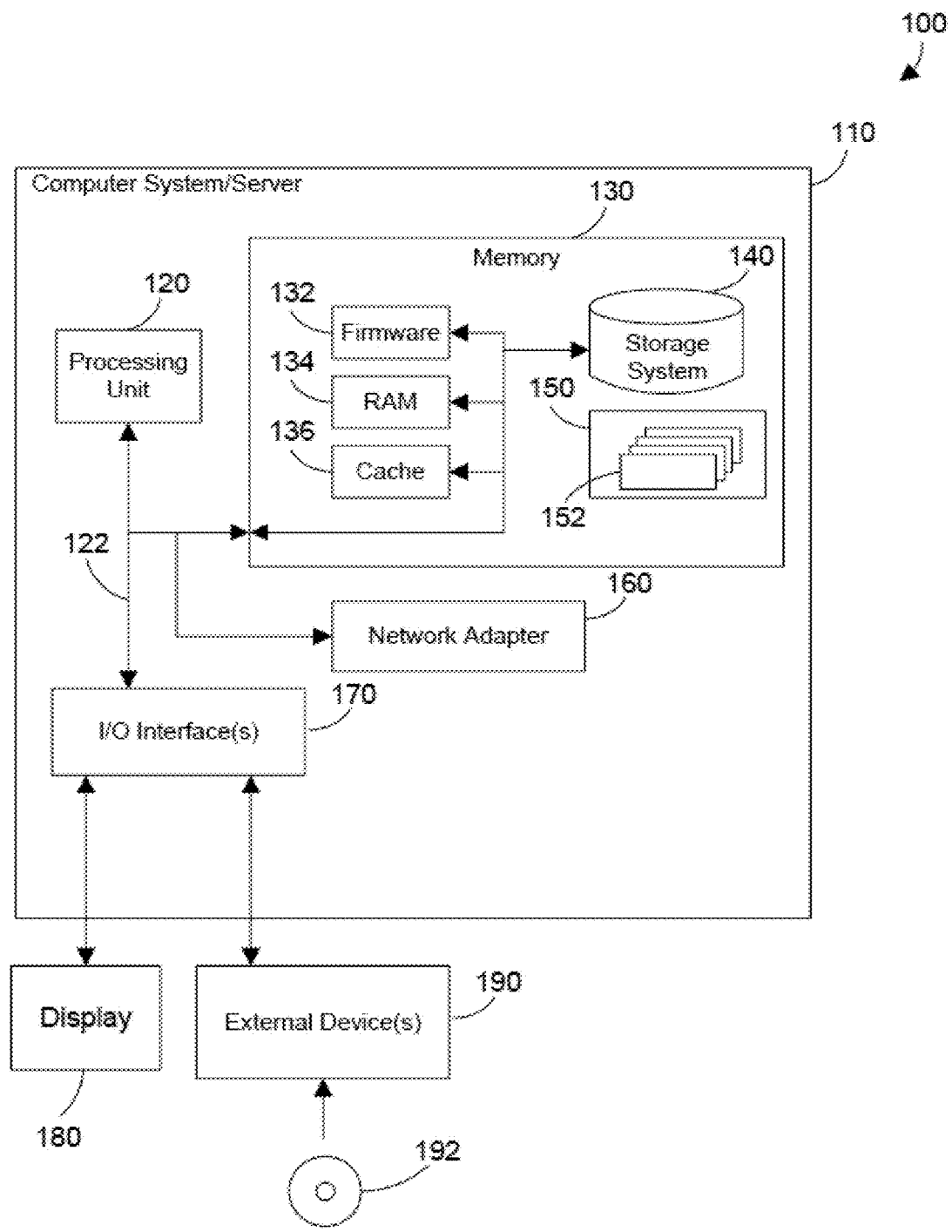
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to ranking database objects based on a plurality of parameters such as individual users who have authority to access the database objects, the frequency in which the database objects are updated, or the frequency in which the database objects are used for automatically placing or moving highly-ranked database objects to faster storage groups such as flash storage. As such, query performance or efficiency may benefit. Features may relate to authorization types on a database object, how the database object is defined in schema, or how often it is accessed in order to to derive a rank for the database objects. In addition, statistics may be captured for database objects in correspondence with the ranking.

With the ongoing growth of data, the need churn out key values before archiving the data has become important. The response time from queries on multi-terabytes of data (or multi-petabytes) is expected to be in milliseconds by corporate leadership. Processing power and memory may be added to systems which are capable of increasing the response time in legacy system. However, such components may pose burdens in adding hardware to optimize the query performance on a multi-petabyte system. As such, a cost to performance ratio may increase as database size increases. Aspects described herein may decrease the cost to performance ratio as the database size grows. Components may ascertain the most important tables of a database based on the rank and can apply actions in response. Aspects described herein can be useful in a cloud implementation with hybrid storage to establish awareness of important database objects in order to prioritize the maintenance work and placement of such important database objects on hybrid storage.

For example, if the database objects in a cloud based environment are ranked where the storage group is defined on both low spinning disk and flash, based on ranking the database can automatically move high ranked database object to flash storage groups for improved performance. A rank of a database object can use the type of authorizations or permissions held by or in association with the database object (e.g., a chief executive officer or chief information officer who may not access the system very often but the tables on which they have access will be still given priority and higher rank in the database for statistics collection). The statistics capture methodology can be used for range partition tables so that if it is a newly added partition, the statistics of only new partition can be collected (e.g., and not full table) which may save time and computing resources. The statistics capture methodology can also be used if multiple columns of the table are always used in all of the queries so that column group statistics can be collected automatically.

A workload management component can be used so that statistics collection is prioritized. In embodiments, a particular database object may not be cached in memory but metadata and system catalogs may be updated with updated statistics (e.g., depending upon query behavior of effected tables) so that there is a query execution plan available for optimizer in order to execute a query. Performance of a user task like a structured query language query may be directly proportional to how well-maintained the relevant database objects are. Aspects described herein may efficiently manage both performance and maintenance. Altogether, elements may rank various database objects, collect regular statistics for highly ranked objects, and feed this information to the workload management component.

Aspects of the disclosure include a computer-implemented method, system, and computer program product of database object management for a shared pool of configurable computing resources. A set of database object profile data is collected. The set of database object profile data is for a set of database objects (e.g., a set of user profile data for a set of users with respect to the set of database objects, a set of update data for the set of database objects, a set of usage data for the set of database objects). Based on the set of database object profile data, a set of database object priority values is determined. The set of database object priority values is for the set of database objects (e.g., a set of user stature values for the set of users with respect to the set of database objects, a set of update frequency values for the set of database objects, a set of usage frequency values for the set of database objects) and, in embodiments, may be computed using a weighting technique for various constituent components. Based on the set of database object priority values, a management action is performed. The management action is performed with respect to the set of database objects.

In embodiments, performing the management action includes comparing the set of database object priority values with a threshold priority value. In various embodiments, performing the management action includes maintaining a first subset of the set of database objects which corresponds with a first subset of the database object priority values that exceed the threshold priority value. In certain embodiments, a second subset of the set of database objects which corresponds with a second subset of the database object priority values that do not exceed the threshold priority value is maintained. In certain embodiments, a second subset of the set of database objects which corresponds with a second subset of the database object priority values that do not exceed the threshold priority value is prevented from being maintained.

In various embodiments, performing the management action includes capturing a first set of statistics for a first subset of the set of database objects which corresponds with a first subset of the database object priority values that exceed the threshold priority value. In certain embodiments, a second set of statistics for a second subset of the set of database objects which corresponds with a second subset of the database object priority values that do not exceed the threshold priority value is captured. In certain embodiments, a second set of statistics for a second subset of the set of database objects which corresponds with a second subset of the database object priority values that do not exceed the threshold priority value is prevented from being captured.

In various embodiments, performing the management action includes placing, on a first data storage medium which has a first access-factor, a first subset of the set of database objects which corresponds with a first subset of the database object priority values that exceed the threshold priority value. In certain embodiments, performing the management action includes placing, on a second data storage medium which has a second access-factor (the first access-factor exceeds the second access-factor), a second subset of the set of database objects which corresponds with a second subset of the database object priority values that do not exceed the threshold priority value. To illustrate, the first and second access-factors may be selected from a group consisting of: an access speed, a start-up time, a random access time, a read latency time, a data transfer rate, a read performance factor, or a file system fragmentation factor. For example, the first data storage medium can include a solid-state drive and the second data storage medium can include a hard disk drive. As another example, the first data storage medium may include a local flash drive and the second data storage medium may include a remote hard disk drive. Altogether, performance or efficiency benefits related to database object management for a shared pool of configurable computing resources may occur (e.g., speed, flexibility, load balancing, responsiveness, high availability, resource usage, productivity). Aspects may save computing resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
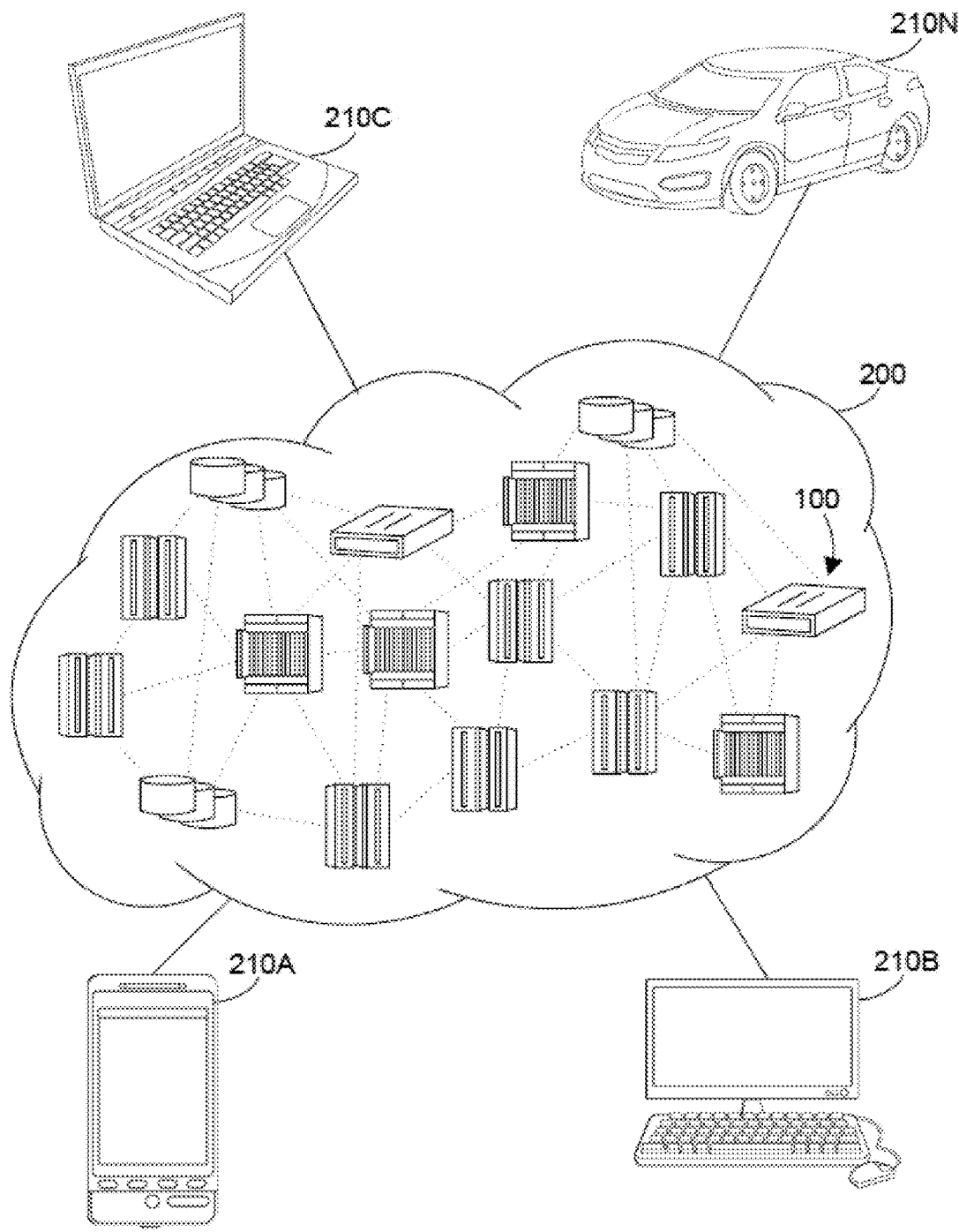
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
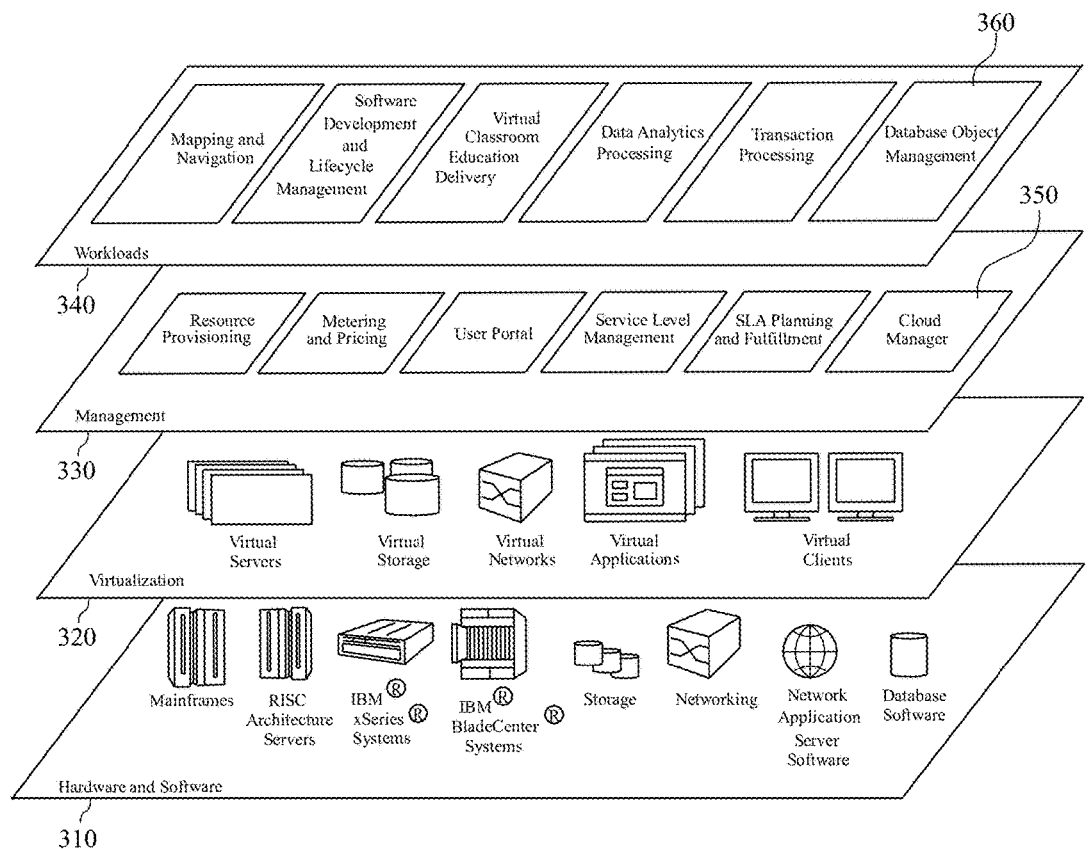
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a database object management layer 360, which may relate to database object management as discussed in more detail below.

Figure 4:
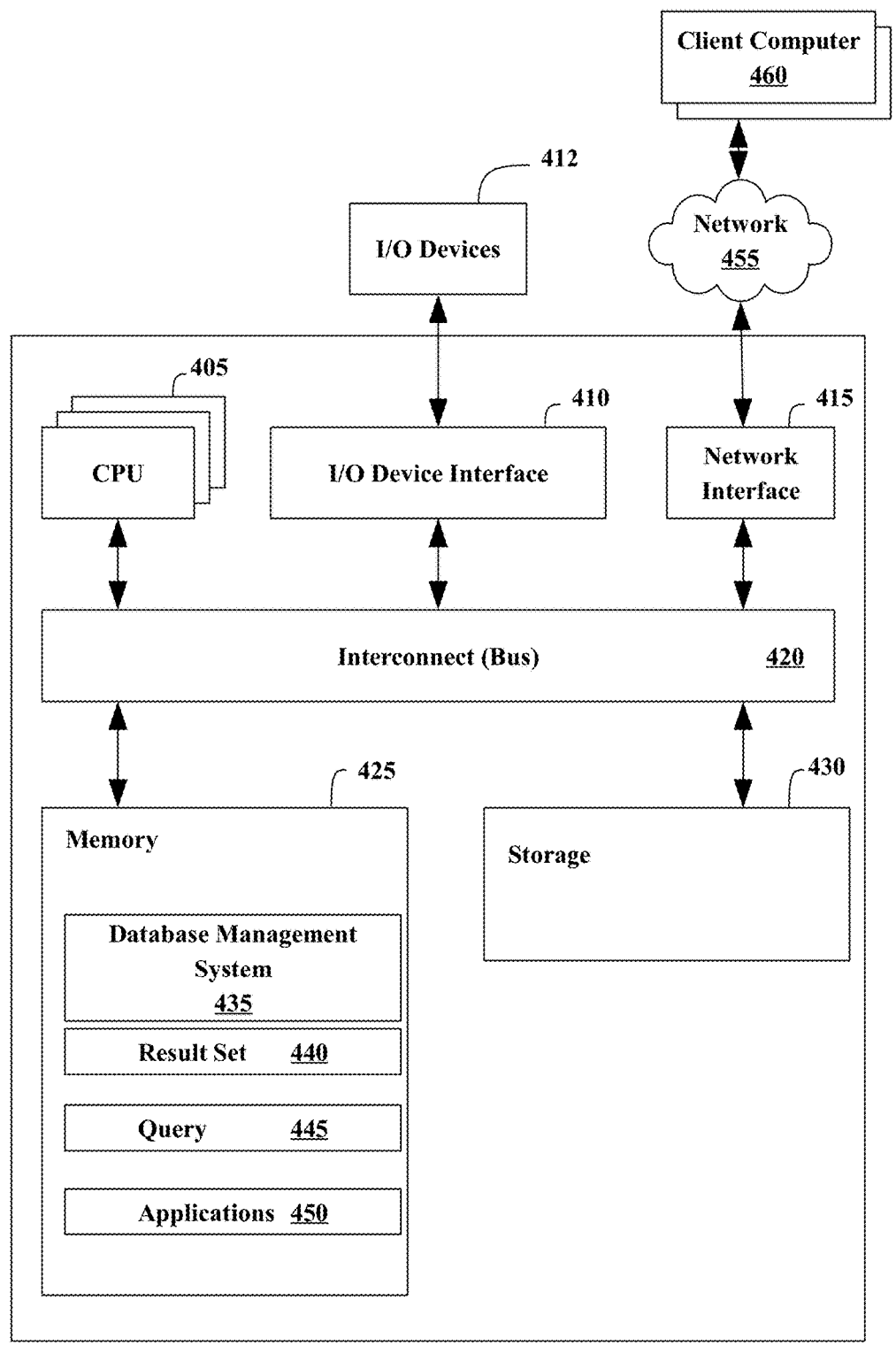
FIG. 4 illustrates an example representation of a computer system connected to a client computer via a network according to embodiments.

FIG. 4 illustrates an example representation of a computer system 400 connected to one or more client computers 460 via a network 455, according to some embodiments. For the purposes of this disclosure, computer system 400 may represent practically any type of computer, computer system, or other programmable electronic device, including but not limited to, a client computer, a server computer, a portable computer, a handheld computer, an embedded controller, etc. In some embodiments, computer system 400 may be implemented using one or more networked computers, e.g., in a cluster or other distributed computing system.

The computer system 400 may include, without limitation, one or more processors (CPUs) 105, a network interface 415, an interconnect 420, a memory 425, and a storage 430. The computer system 400 may also include an I/O device interface 410 used to connect I/O devices 412, e.g., keyboard, display, and mouse devices, to the computer system 400.

Each processor 405 may retrieve and execute programming instructions stored in the memory 425 or storage 430. Similarly, the processor 405 may store and retrieve application data residing in the memory 425. The interconnect 420 may transmit programming instructions and application data between each processor 405, I/O device interface 410, network interface 415, memory 425, and storage 430. The interconnect 420 may be one or more busses. The processor 405 may be a single central processing unit (CPU), multiple CPUs, or a single CPU having multiple processing cores in various embodiments. In one embodiment, a processor 405 may be a digital signal processor (DSP).

The memory 425 may be representative of a random access memory, e.g., Static Random Access Memory (SRAM), Dynamic Random Access Memory (DRAM), read-only memory, or flash memory. The storage 430 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 415 may be configured to transmit data via the communications network 455.

The memory 425 may include a database management system (DBMS) 435, a result set 440, a query 445, and applications 450. Although these elements are illustrated as residing in the memory 425, any of the elements, or combinations thereof, may reside in the storage 430 or partially in the memory 425 and partially in the storage 430. Each of these elements will be described in greater detail in accordance with FIG. 5.

The network 455 may be any suitable network or combination of networks and may support any appropriate protocol suitable for communication of data and/or code to/from the server computer system 400 and the client computer system 460. In some embodiments, the network 455 may support wireless communications. In other embodiments, the network 455 may support hardwired communications. The network 455 may be the Internet and may support Internet Protocol in some embodiments. In other embodiments, the network 455 may be implemented as a local area network (LAN) or a wide area network (WAN). The network 455 may also be implemented as a cellular data network. Although the network 455 is shown as a single network in the figures, one or more networks of the same or different types may be included.

The client computer system 460 may include some or all of the hardware and software elements of the computer system 400 previously described. As shown, there may be one or more client computers 460 connected to the computer system 400 via the network 455. In some embodiments, one or more client computers 460 may send a query 445 by network 455 to computer system 400 and receive a result set 440.

Figure 5:
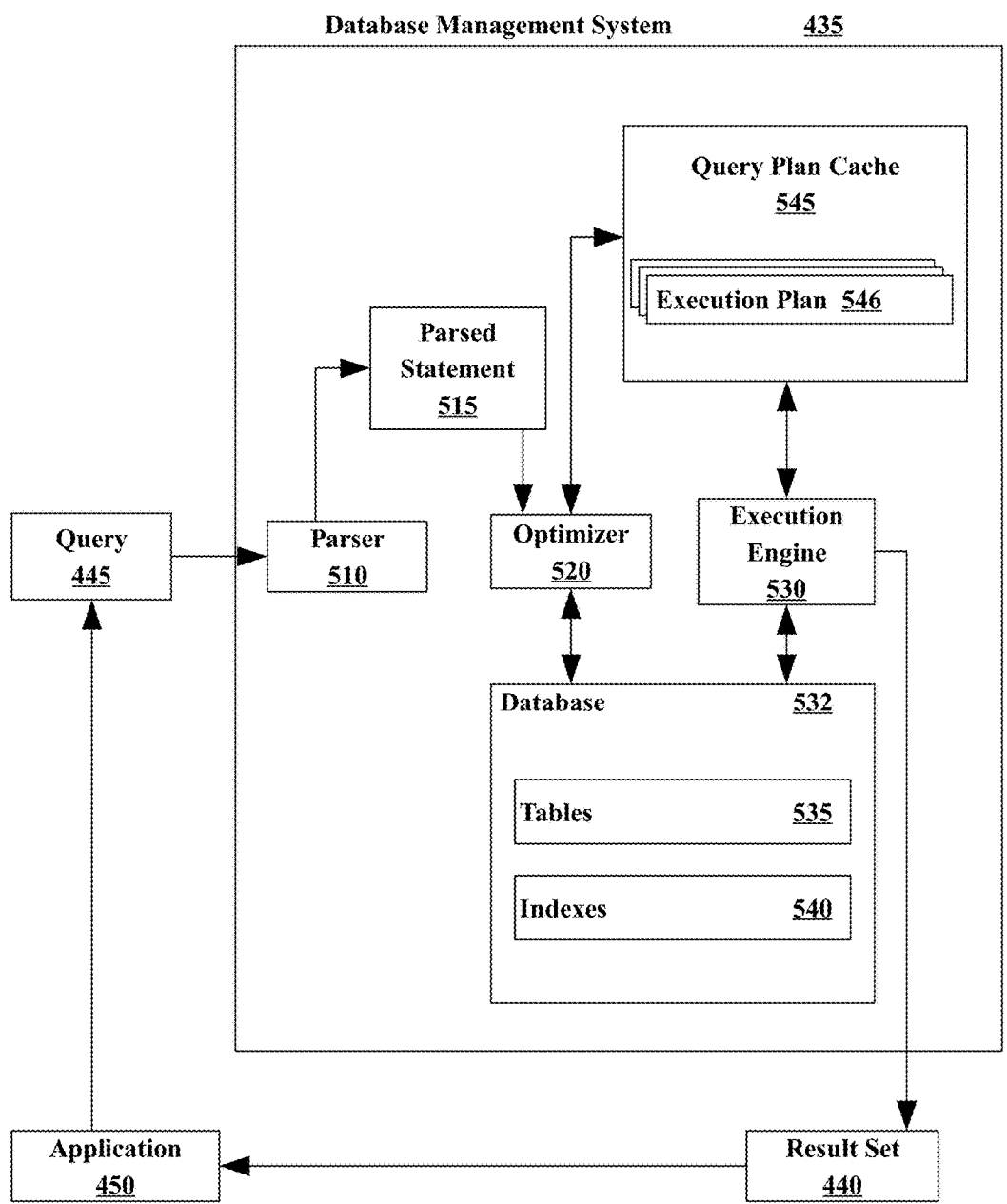
FIG. 5 illustrates an example database management system (DBMS) according to embodiments.

FIG. 5 illustrates an example database management system (DBMS) 435. The DBMS 435 may include a parser 510, an optimizer 520, an execution engine 530, and a database 532. The parser 510 may receive a database query 445 from an application 450. In some embodiments, the database query 445 may be in the form of a Structured Query Language (SQL) statement. The parser 510 may generate a parsed statement 515. The parser 510 may send the parsed statement 515 to an optimizer 520. The optimizer 520 may attempt to optimize the parsed statement. In some embodiments, optimizing may improve the performance of the database query 445 by, for example, reducing the amount of time it takes to provide a user with a response. The optimizer 520 may generate an execution plan 546 (may also be referred to as a query plan or an access plan), which may be maintained in a query plan cache 545, according to some embodiments. The query plan cache 545 may include one or more execution plans 546, including the current execution plan as well as previously used execution plans. Once an execution plan 546 is generated, the execution plan 546 may be sent to the execution engine 530. The execution engine 530 may execute the query 445. Executing the query 445 may include finding and retrieving data in the database tables 535 that satisfies the criteria supplied in the query 445. The execution engine 530 may store the data returned matching the query 445 in a result set 440. The DBMS 435 may return the result set 440 to an application 450, such as the application in which the database query 445 was generated, as a response to the database query 445.

A database 532 may include one or more tables 535 and, in some embodiments, one or more indexes 540. A database table 535 may organize data into rows and columns. Each row of a database table 535 may correspond to an individual entry, a tuple, or a record in the database 532. A column may define what is stored in each entry, tuple, or record. In some embodiments, columns of a table 535 may also be referred to as fields or attributes. Each table 535 within the database 532 may have a unique name. Each column within a table 535 may also have a unique name. A row, tuple, or record, however, within a particular table 535 may not be unique, according to some embodiments. A database 532 may also include one or more indexes 540. An index 540 may be a data structure that may inform the DBMS 435 of the location of a particular record within a table 535 if given a particular indexed column value. In some embodiments, the execution engine 530 may use the one or more indexes 540 to locate data within a table 535. In other embodiments, the execution engine 530 may scan the tables 535 without using an index 540.

As mentioned herein, the optimizer 520 creates the query access plan. The optimizer 520 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 6:
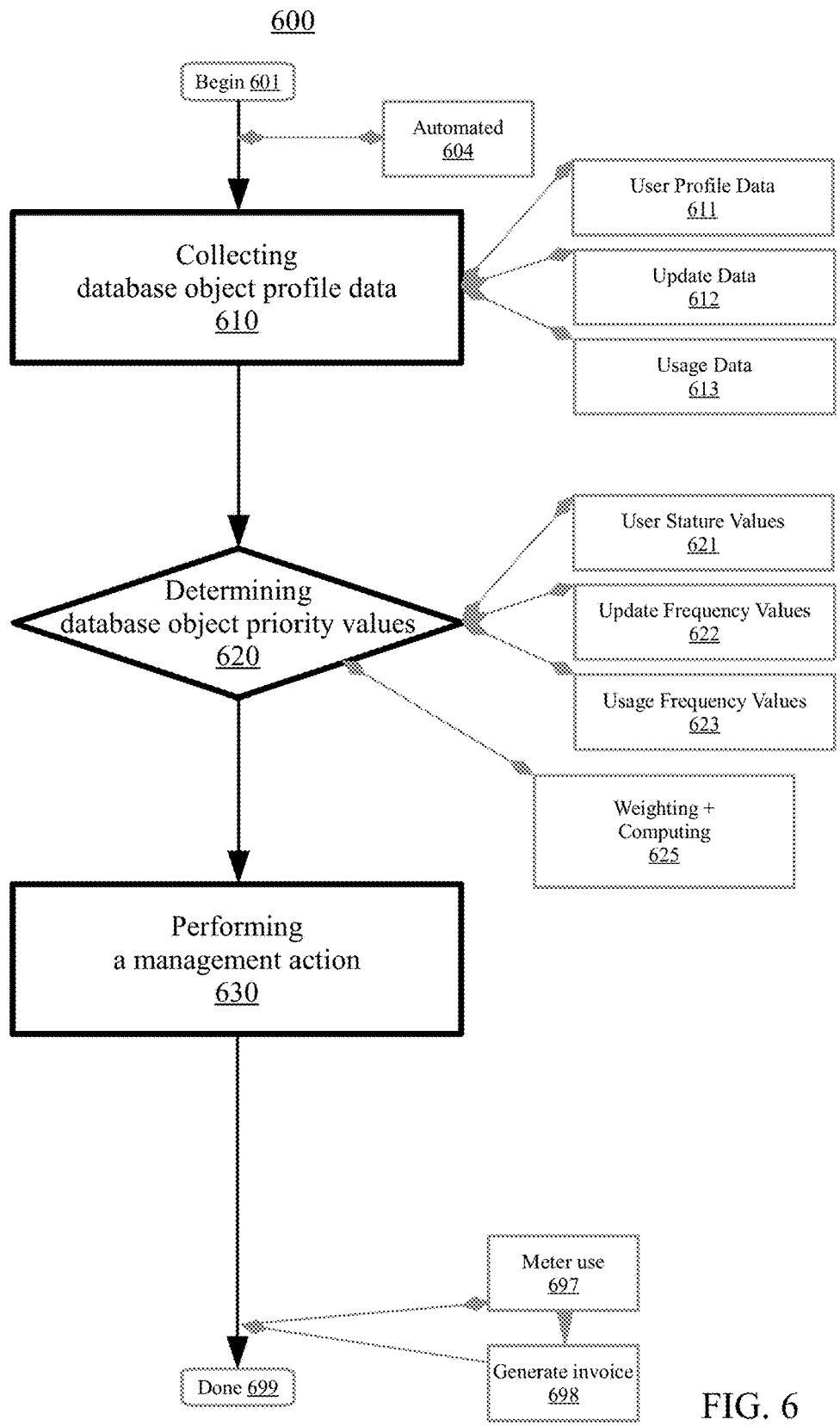
FIG. 6 is a flowchart illustrating a method of database object management for a shared pool of configurable computing resources, according to embodiments.

FIG. 6 is a flowchart illustrating a method 600 of database object management for a shared pool of configurable computing resources according to embodiments. The method may begin at block 601. In embodiments, the operational steps (e.g., the collecting, the determining, the performing) each occur in an automated fashion (e.g., automatically by a computer) without user/manual intervention at block 604.

At block 610, a set of database object profile data is collected. The set of database object profile data is for a set of database objects. The set of database objects can include a data structure used to store or reference data. For example, a database object may include a table an index, a stored procedure, a sequence, a view, or the like. Accordingly, a database object here can include feature that has an entry in a system catalog. For instance, each partition of a range partitioned table may be considered to be a separate database object. Collecting can include accumulating, acquiring, aggregating, capturing, gathering, obtaining, saving, or storing. The set of database object profile data may be collected in a multidimensional array, list, database, or other data store.

In embodiments, the set of database object profile data can have information related to various authorities, updates, or usage of one or more database objects. The set of database object profile data may have a set of user profile data for a set of users with respect to the set of database objects at block 611. For instance, the set of user profile data for the set of users may correspond to an organizational hierarchy database (e.g., having a set of permissions) which is used to authorize/permit a corporate chief information officer to utilize a first set of tables, a division internal auditor to utilize a second set of tables which is only a portion of the first set of tables, and a department administrative assistant to utilize a third set of tables which is only a portion of the second set of tables. As another example, the set of user profile data may account for users which are frequent customers/users (e.g., historical accesses by whom/when) of the database objects (e.g., an organizational statistician user and the group of computers the organizational statistician user utilizes to access the database objects). In certain embodiments, various levels or access speeds to the set of database objects may be provided based on the set of user profile data for the set of users.

The set of database object profile data may have a set of update data for the set of database objects at block 612. The set of update data may pertain to update/modification accesses (or frequency of update accesses) to the set of database objects. Accordingly, the set of update data may include historical update accesses, current update accesses, or predicted future update accesses. The update accesses may be related to writes, reads, deletes, etc. The set of update data may correlate to specific users, specific user-groups, specific application programs, specific virtual machines, specific temporal periods, specific data sizes/quantities, or the like. For example, the set of update data may record in a data store that a database administrator located at a remote location running both a first and a second application program wrote two gigabytes of data into four-hundred entries of a certain table in a two-minute timeframe on a Tuesday afternoon. Subsequently, a corporate statistician ran a particular query on the certain table within a twenty-four hour period (e.g., on Wednesday morning on the last day of the fiscal quarter) in reliance upon the updated data from the database administrator on the previous day and save results from the particular query in association with the certain table and various indexes.

The set of database object profile data may have a set of usage data for the set of database objects at block 613. The set of usage data may pertain to usage accesses (or frequency of usage accesses) to the set of database objects. Accordingly, the set of usage data may include historical usage accesses, current usage accesses, or predicted future usage accesses. The usage accesses may be related to queries, searches, reads, etc. The set of usage data may correlate to specific users, specific user-groups, specific application programs, specific virtual machines, specific temporal periods, specific data sizes/quantities, or the like. For instance, the corporate statistician running the particular query on the certain table may be considered a usage access to the set of database objects. As another example, the set of usage data may include an expected read of the set of database objects (e.g., a new application program has been configured to read a specific table on the first Monday morning each month at 5 am, the contents of the set of database objects indicate a likelihood which exceeds a threshold of a corporate audit by an internal auditor).

At block 620, a set of database object priority values is determined based on the set of database object profile data. The set of database object priority values is for the set of database objects. Determining can include ascertaining, identifying, resolving, formulating, computing, or calculating. The determined set of database object priority values may be saved to a multidimensional array, list, database, or other data store. In embodiments, the determining may have both a weighting operation for aspects of the set of database object profile data and a computing operation based on a set of outputs/products of the weighting operation.

In embodiments, the set of database object priority values can have an ordering, sorting, or ranking associated with numbers, scores, levels, tiers, or indicators (e.g., colors, symbols) pertaining to the set of database objects based on the set of database object profile data (e.g., as described herein or equivalents). Accordingly, the set of database object priority values may indicate a (relative) importance. The set of database object priority values may indicate a set of user stature values for the set of users with respect to the set of database objects at block 621. The set of user stature values for the set of users can relate to an organizational hierarchy (e.g., higher ranking users such as vice presidents have greater stature values than lower ranking users such as administrative assistants, 85>21). The set of user stature values for the set of users can relate to an authority/permission-level to access a particular database object (e.g., classified data database administrators may have greater authority to access a table than hallway cleaning staff, Tier 3>Tier 5). As such, database objects accessed by higher ranking users may have higher database object priority values and database objects accessed by lower ranking users may have lower database object priority values. For example, a quarterly earnings report table accessed daily by the chief executive officer may have a database object priority value of 100 while a telephone call log (without substantive information) to the shipping dock which is only rarely accessed (e.g., in the case of five consecutive missed calls to the shipping dock) by a traffic control administrative assistant may have a database object priority value of 12.

The set of database object priority values may indicate a set of update frequency values for the set of database objects at block 622. The set of update frequency values can indicate a pace or a rate of inserts or deletes. Accordingly, the set of update frequency values may relate to a change factor for a rate of change of the set of database objects. The set of update frequency values may correlate to changes in specific users, specific user-groups, specific application programs, specific virtual machines, specific temporal periods, specific data sizes/quantities, or the like. For example, a first database object may be altered every day, a second database object may be altered once per week, and a third database object may be altered once per month. As such, more frequently updated database objects may be chosen to have relatively greater database object priority values as indicated by the set of update frequency values (e.g., first>second>third). As another example, database objects having repeated changes in specific users may have greater update frequency values than database objects whose specific users change less often. For instance, a first index which is updated by every user who logs-on and new users are added daily may have a relatively higher update frequency value than a second index which is updated by only the single database administrator employed by a small company.

The set of database object priority values may indicate a set of usage frequency values for the set of database objects at block 623. The set of usage frequency values can indicate a pace or a rate of the set of database objects which is used in a query, a query plan, or a similar operation (e.g., reads). To illustrate, the set of usage frequency values may indicate a query usage rate based on historical usage accesses, current usage accesses, or predicted future usage accesses. The set of usage frequency values may correlate to usage by specific users, specific user-groups, specific application programs, specific virtual machines, specific temporal periods, specific data sizes/quantities, or the like. For example, a first database object may be predicted to be used by a first new query on a daily basis to return a first report for a new chief information officer whereas a second database object may be predicted to be used by a second new query on a monthly basis to return a second report for the new chief information officer. As such the first database object may have both a greater usage frequency value and likely a higher database object priority value (e.g., depending on weighting aspects). As another example, historical usage accesses may indicate that a third database object is read hourly and a fourth database object is used by a query weekly. As such, the third database object may have both a greater usage frequency value and likely a higher database object priority value.

In embodiments, determining the set of database object priority values for the set of database objects includes a set of operations at block 625. The set of operations can include weighting the set of user stature values with a first weight (e.g., 35%). The set of operations can include weighting the set of update frequency values with a second weight (e.g., 25%). The set of operations can include weighting the set of usage frequency values with a third weight (e.g., 40%). The set of operations can include computing the set of database object priority values using the first, second, and third weights. For example (using a scale of 0-100 with 100 being the highest), a first database object may have a first user stature value of 50, a first update frequency value of 60, and a first usage frequency value of 40, and a second database object may have a second user stature value of 70, a second update frequency value of 50, and a second usage frequency value of 30. To illustrate, the weights may be multiplied with the values and then summed to compute individual priority values. As such, the first database object priority value may be 48.5 (0.35*50+0.25*60+0.40*40) and the second database object priority value may be 49 (0.35*70+0.25*50+ 0.40*30). Accordingly, the second database object may have a higher priority value (and therefore may be used subsequently as such). In various embodiments, threshold may be utilized to determine actions (e.g., above 50 gets a first treatment and below 50 gets a second treatment). In certain embodiments, priority values within a threshold value (e.g., within 3) may be treated as equivalents and no true distinction may be made for subsequent use (e.g., the first and second database objects may be treated the same even though they have different specific values).

At block 630, a management action is performed based on the set of database object priority values. The management action is performed with respect to the set of database objects. The management action may have various comparison or ranking actions as described herein. The management action can include maintenance operations (e.g., updates, writes, deletes), capture operations (e.g., to collect statistics), placement operations (e.g., on specific servers, virtual machines, hardware), or the like. Various management action techniques may be described in FIG. 7, FIG. 8, or FIG. 9 and utilized in conjunction with any or all of the description or associated FIGS. 1-9.

In embodiments, a usage assessment may be generated with respect to the database object management or management actions. Use of the database object management may be metered at block 697. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 698. The generated invoice may be provided (e.g., displayed in a dialog box, sent or transferred by e-mail, text message, initiated for traditional mail) to the user for notification, acknowledgment, or payment.

Method 600 concludes at block 699. Aspects of method 600 may provide performance or efficiency benefits for database object management. For example, aspects of method 600 may have positive impacts with respect to the speed of retrieval of data of a database object. Altogether, performance or efficiency benefits (e.g., load balancing, responsiveness, high availability, resource usage) may occur when managing database objects in a shared pool of configurable computing resources.

Figure 7:
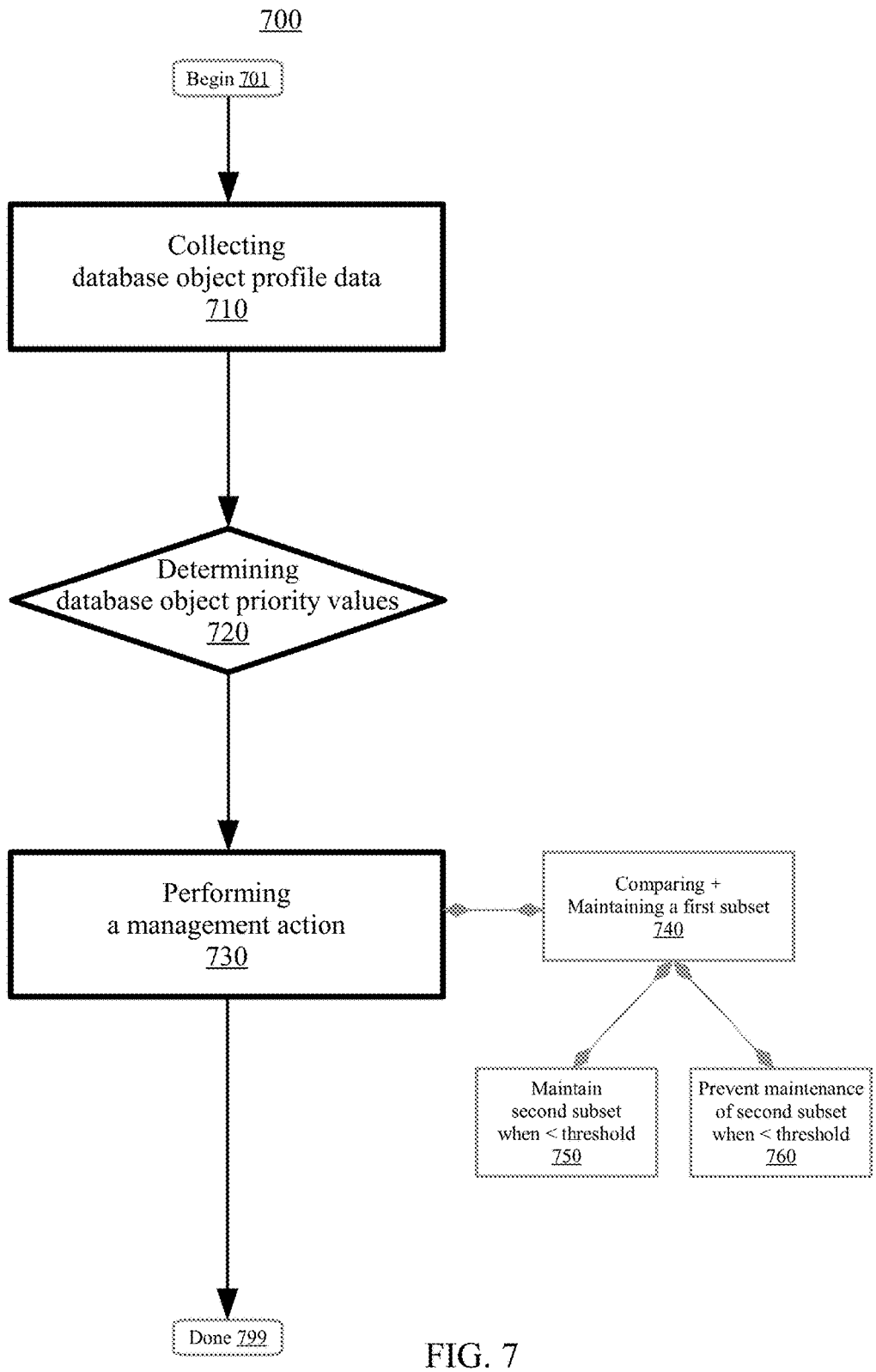
FIG. 7 is a flowchart illustrating a method of database object management for a shared pool of configurable computing resources, according to embodiments.

FIG. 7 is a flowchart illustrating a method 700 of database object management for a shared pool of configurable computing resources according to embodiments. Aspects of method 700 may be similar or the same as aspects of method 600 and aspects may be utilized with other methodologies described herein (e.g., method 600, method 800, method 900). The method 700 may begin at block 701. At block 710, a set of database object profile data is collected. The set of database object profile data is for a set of database objects. At block 720, a set of database object priority values is determined based on the set of database object profile data. The set of database object priority values is for the set of database objects. At block 730, a management action is performed based on the set of database object priority values. The management action is performed with respect to the set of database objects.

In embodiments at block 740, performing the management action includes a comparison operation and a maintenance operation. The comparison operation may compare the set of database object priority values with a threshold priority value. The threshold priority value may be predetermined, user-defined, machine-learned, based on historical data, used to prioritize a given proportion of database objects, or the like. The maintenance operation can include writes, additions, deletions, changes, reads, or the like. A first subset of the set of database objects which corresponds with a first subset of the database object priority values that exceed the threshold priority value may be maintained. For example, if the threshold priority value is 80, a first database object (of a group of ten database objects) with a first threshold priority value of 85 may be maintained or selected for maintenance. To illustrate, the first database object may be a first index which is maintained (e.g., kept up-to-date).

In various embodiments at block 750, in response to maintaining the first subset of the set of database objects a second subset of the set of database objects which corresponds with a second subset of the database object priority values that do not exceed the threshold priority value may be maintained. As such, those database objects with a higher priority value (e.g., those exceeding the threshold priority value) are maintained temporally in advance of those database objects with a lower priority value (e.g., those falling below the threshold priority value). In certain embodiments, the threshold priority value may be one less than the greatest of the database object priority values (e.g., ensuring the database object with the greatest of the database object priority values is maintained temporally first). Maintenance can include initiation of maintenance. In certain embodiments, maintenance on a first database object is fully completed before maintenance of a second database object begins.

In various embodiments at block 760, maintenance of a second subset of the set of database objects which corresponds with a second subset of the database object priority values that do not exceed the threshold priority value is prevented, disabled, disregarded, or skipped. As such, computing resources may be saved related to lower priority database objects (e.g., indexes for lower stature users which are rarely updated or used). For example, the threshold priority value may be an average of a group of average component priority values for individual database objects. For instance user stature values of 80, 70, and 60 may average 70, update frequency values of 60, 50, and 10 may average 40, usage frequency values of 60, 60, and 30 may average 50, and the overall average of the component priority values 70, 40, and 50 may yield a threshold priority value of 53.33. Accordingly, database object(s) with a database object priority value of less than 53.33 may be prevented, disabled, disregarded, or skipped with respect to maintenance on the database object(s).

Method 700 concludes at block 799. Aspects of method 700 may provide performance or efficiency benefits for database object management. For example, aspects of method 700 may have positive impacts with respect to maintenance burdens of one or more database objects. Altogether, performance or efficiency benefits (e.g., hardware resource usage, computing capability in lieu of excess maintenance, responsiveness, high availability) may occur when managing database objects in a shared pool of configurable computing resources.

Figure 8:
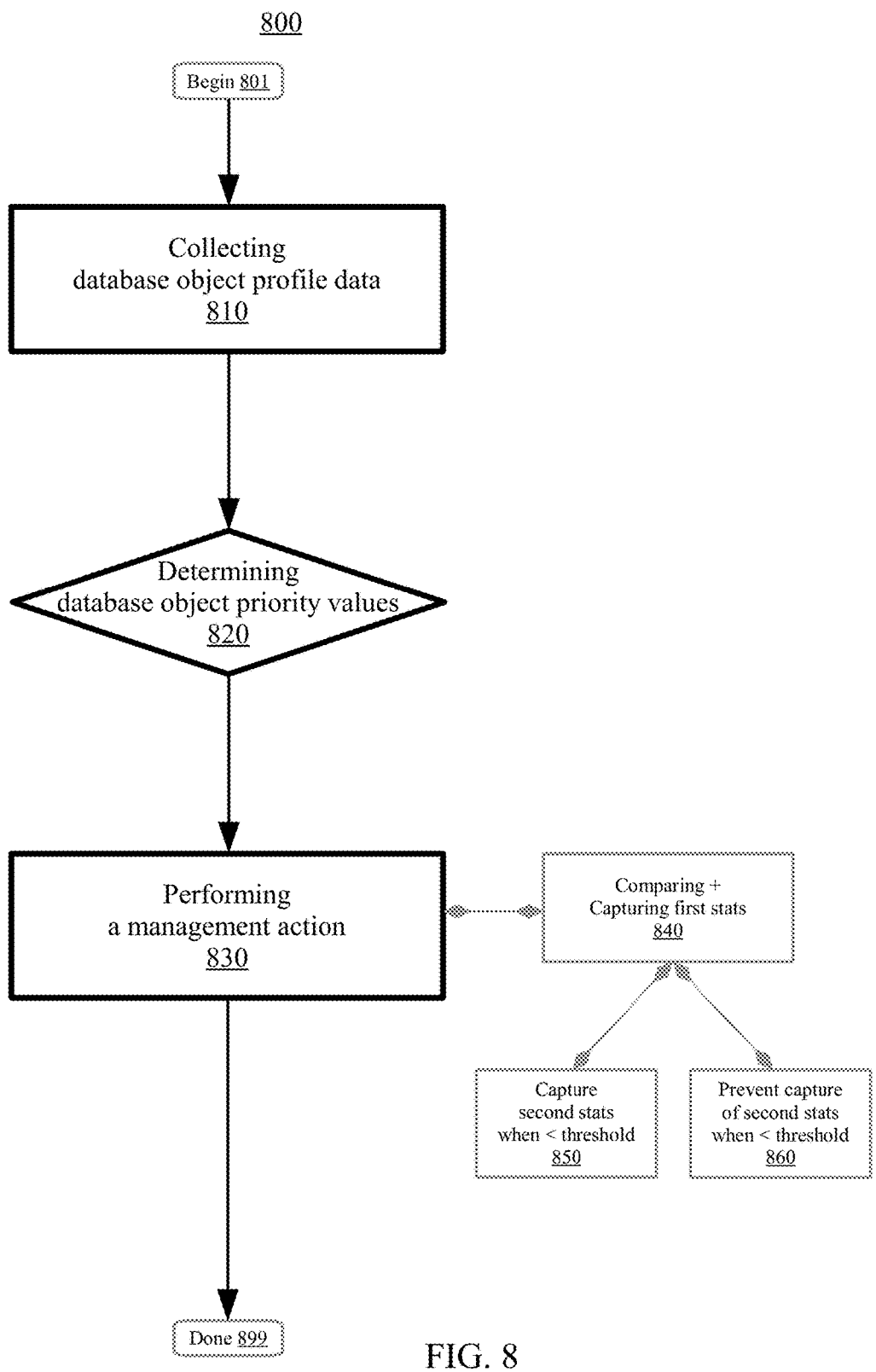
FIG. 8 is a flowchart illustrating a method of database object management for a shared pool of configurable computing resources, according to embodiments.

FIG. 8 is a flowchart illustrating a method 800 of database object management for a shared pool of configurable computing resources according to embodiments. Aspects of method 800 may be similar or the same as aspects of method 600 and aspects may be utilized with other methodologies described herein (e.g., method 600, method 700, method 900). The method 800 may begin at block 801. At block 810, a set of database object profile data is collected. The set of database object profile data is for a set of database objects. At block 820, a set of database object priority values is determined based on the set of database object profile data. The set of database object priority values is for the set of database objects. At block 830, a management action is performed based on the set of database object priority values. The management action is performed with respect to the set of database objects.

In embodiments at block 840, performing the management action includes a comparison operation and a capture operation. The comparison operation may compare the set of database object priority values with a threshold priority value. The threshold priority value may be predetermined, user-defined, machine-learned, based on historical data, used to prioritize a given proportion of database objects, or the like. The capture operation can capture a first set of statistics for a first subset of the set of database objects which corresponds with a first subset of the database object priority values that exceed the threshold priority value. As such, statistics are captured, identified, collected, resolved, or gathered for higher priority database objects with respect to the threshold priority value. In certain embodiments, statistics may be gathered more frequently or more robustly for such higher priority database objects. For instance, for database objects that are ranked higher, statistics collection using "RUNSTATS" may be carried-out more frequently. As such, better cardinality estimates by the optimizer may result. In various embodiments, such highly ranking database objects can be assigned, allocated, placed, or deployed with respect to various computing resources accordingly (e.g., by using the captured statistics).

In various embodiments at block 850, in response to capturing the first set of statistics for the first subset of the set of database objects, a second set of statistics for a second subset of the set of database objects which corresponds with a second subset of the database object priority values that do not exceed the threshold priority value can be captured. As such, those database objects with a higher priority value (e.g., those exceeding the threshold priority value) have statistics captured temporally in advance of those database objects with a lower priority value (e.g., those falling below the threshold priority value). In certain embodiments, the threshold priority value may be one less than the greatest of the database object priority values (e.g., ensuring the database object with the greatest of the database object priority values has statistics captured temporally first). Capture can include initiation of a collection operation. In certain embodiments, capture of statistics of a first database object is fully completed before capture of statistics of a second database object begins.

In various embodiments at block 860, capture of a second set of statistics for a second subset of the set of database objects which corresponds with a second subset of the database object priority values that do not exceed the threshold priority value is prevented, disabled, disregarded, or skipped. As such, computing resources may be saved related to lower priority database objects (e.g., indexes for lower stature users which are rarely updated or used). For example, the threshold priority value may be an average of a group of average component priority values for individual database objects. For instance user stature values of 80, 70, and 60 may average 70, update frequency values of 60, 50, and 10 may average 40, usage frequency values of 60, 60, and 30 may average 50, and the overall average of the component priority values 70, 40, and 50 may yield a threshold priority value of 53.33. Accordingly, database object(s) with a database object priority value of less than 53.33 may be prevented, disabled, disregarded, or skipped with respect to statistics collection for the database object(s).

Method 800 concludes at block 899. Aspects of method 800 may provide performance or efficiency benefits for database object management. For example, aspects of method 800 may have positive impacts with respect to statistics capture burdens of one or more database objects. Altogether, performance or efficiency benefits (e.g., hardware resource usage, computing capability in lieu of excess statistics collection, responsiveness, high availability) may occur when managing database objects in a shared pool of configurable computing resources.

Figure 9:
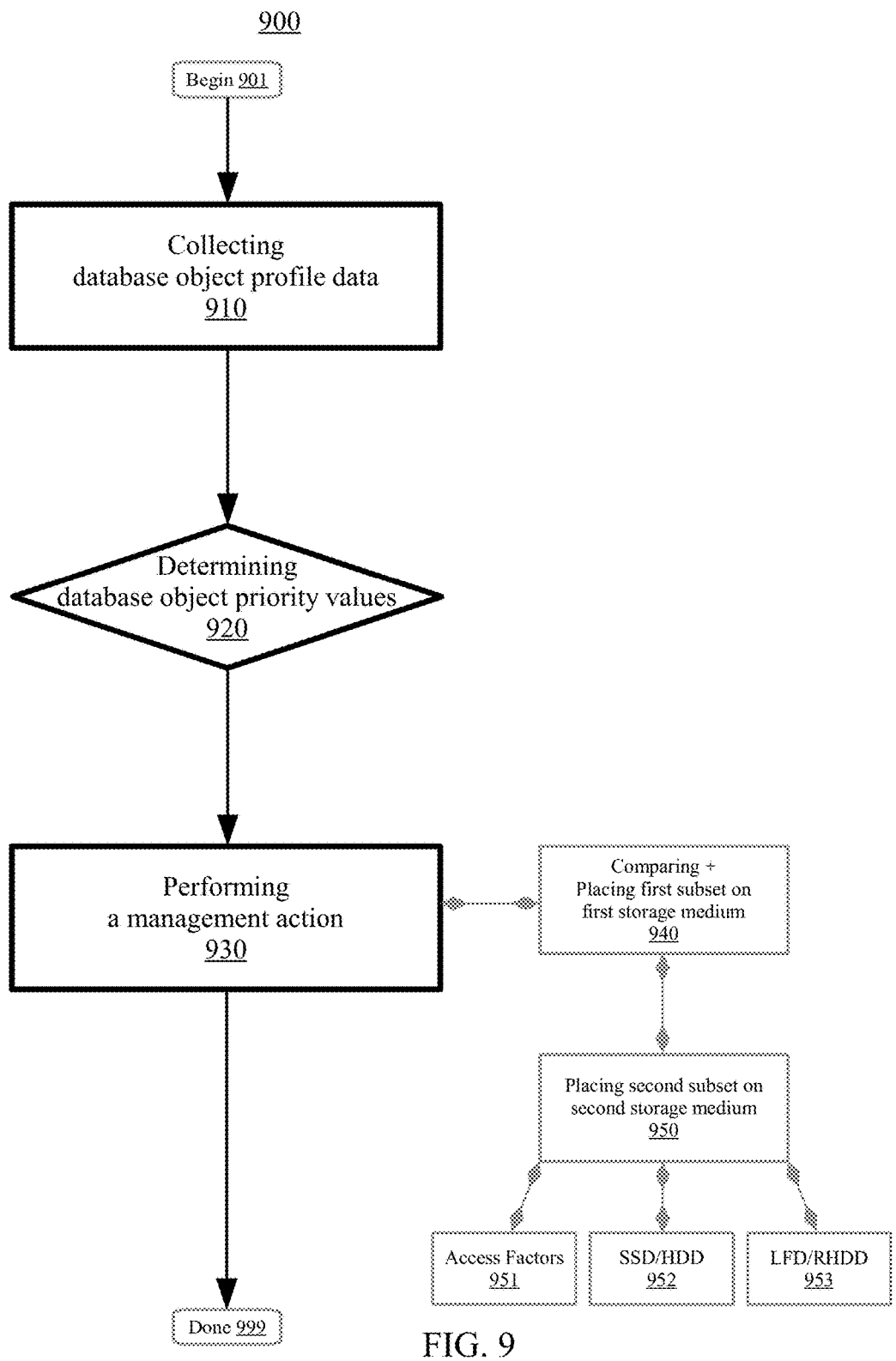
FIG. 9 is a flowchart illustrating a method of database object management for a shared pool of configurable computing resources, according to embodiments.

FIG. 9 is a flowchart illustrating a method 900 of database object management for a shared pool of configurable computing resources according to embodiments. Aspects of method 900 may be similar or the same as aspects of method 600 and aspects may be utilized with other methodologies described herein (e.g., method 600, method 700, method 800). The method 900 may begin at block 901. At block 910, a set of database object profile data is collected. The set of database object profile data is for a set of database objects. At block 920, a set of database object priority values is determined based on the set of database object profile data. The set of database object priority values is for the set of database objects. At block 930, a management action is performed based on the set of database object priority values. The management action is performed with respect to the set of database objects.

In embodiments at block 940, performing the management action includes a comparison operation and a placement operation. The comparison operation may compare the set of database object priority values with a threshold priority value. The threshold priority value may be predetermined, user-defined, machine-learned, based on historical data, used to prioritize a given proportion of database objects, or the like. The placement operation can place/deploy, on a first data storage medium which has a first access-factor, a first subset of the set of database objects which corresponds with a first subset of the database object priority values that exceed the threshold priority value. As such, placement on the first storage medium may occur for higher priority database objects with respect to the threshold priority value.

In various embodiments at block 950, the placement operation can place/deploy, on a second data storage medium which has a second access-factor, a second subset of the set of database objects which corresponds with a second subset of the database object priority values that do not exceed the threshold priority value. The first access-factor may exceed the second access-factor. As such, those database objects with a higher priority value (e.g., those exceeding the threshold priority value) are placed on storage media with relatively/comparatively greater access-factors with respect to those database objects with a lower priority value (e.g., those falling below the threshold priority value). In certain embodiments, the threshold priority value may be one less than the greatest of the database object priority values (e.g., ensuring the database object with the greatest of the database object priority values is placed on a faster storage medium). Placement can include initiation of a placement/deployment operation. In certain embodiments, placement a first database object is fully completed before placement of a second database object begins.

The shared pool of configurable computing resources may have various storage mediums in multiple locations with multiple types of physical storage hardware (e.g., various drive technologies). Accordingly, the first and second access-factors may have various configurations at block 951. In embodiments, the first access-factor includes a first access speed (e.g., a temporal period to retrieve a given amount of information, 100 rows per second), and the second access-factor includes a second access speed (e.g., 80 rows per second). In various embodiments, the first and second access-factors include a selection from a group consisting of at least one of: a start-up time (e.g., temporal period to ready a storage device for activity), a random access time (e.g., temporal period to locate a single piece of information and make it available to the computer for processing), a read latency time (e.g., temporal period it takes to position the proper sector under the read/write head), a data transfer rate (e.g., speed of travel of a given amount of data from one place to another), a read performance factor (e.g., temporal period it takes to read a given amount of data), or a file system fragmentation factor (e.g., ability/inability of a file system to lay out related data sequentially/contiguously).

In various embodiments, the first data storage medium includes a solid-state drive and the second data storage medium includes a hard disk drive (e.g., with both part of a cloud server datacenter) at block 952. In various embodiments, the first data storage medium includes a local drive such as a local flash drive (e.g., local to the query optimizer, local relative to a remote drive) and the second data storage medium includes a remote drive such as a remote hard disk drive (e.g., cloud server, off-site compute node) at block 953.

Method 900 concludes at block 999. Aspects of method 900 may provide performance or efficiency benefits for database object management. For example, aspects of method 900 may have positive impacts with respect to placement/storage of one or more database objects. Altogether, performance or efficiency benefits (e.g., hardware resource usage, speed, responsiveness, high availability) may occur when managing database objects in a shared pool of configurable computing resources.

To illustrate an example embodiment, a collector module and a rank computation module may be utilized. The collector module can collect information regarding authorities, updates, or usage of an object. The authority or privilege on a database object can be determined by querying one or more system catalogs. For instance, "select authid, privilege, objectname from sysadm.privileges where objecttype='TABLE'". Updates and reads on the table can be determined by using snapshot infrastructure such as the output of "db2pd -db dbname -tcb" which may provide "Table Stats: Address TableName SchemaNm Scans UDI RTSUDI PgReorgs NoChgUpdts Reads FscrUpdates Inserts Updates Deletes OvFlReads OvFlCrtes RowsComp RowsUncomp CCLogReads StoreBytes BytesSaved". The collector module can sort this output on the basis of, first, an Update Delete Insert (UDI) counter and, then, read commands. For each database object, the collector module may convey/transmit the data collected to the rank computation module.

The rank computation module may rank database objects in a range of 0 to 100, where 100 is the highest rank and 0 is the lowest rank. The higher the rank the more important the database object may be to keep it maintained. Consider the following commands where TableUsage is a number of times the given table was accessed in given period of time, where AllTablesUsage is a sum of the TableUsage for every table, and where TableRank is a ratio of the given table's usage and total usage (e.g., a percentage): "if (AllTablesUsage==0) then TableRank=0, else TableRank=TableUsage/AllTablesUsage*100". If the given table has a special permission, then a predefined weight can be added. In certain embodiments, a maximum rank that a table can achieve due to a special permission is 90 such that "if (table has special permission) then TableRank =MINIMUM(90, TableRank+50)". As such, aspects described herein may periodically check for table rank (e.g., say every 24 hours) and update a configuration of the workload management component accordingly. Initially, the tables (except the special ones) may have the same ranks, and the ranks can change as/when aspects described herein are utilized.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of database object management for a shared pool of configurable computing resources, the method comprising:

collecting a set of database object profile data for a set of database objects, wherein the set of database objects comprises a first subset of database objects and a second subset of database objects;

determining, based on the set of database object profile data, a first subset of database object priority values for the first subset of database objects and a second subset of database object priority values for the second subset of database objects, wherein the database object priority value is calculated based on a weighted summation of an update frequency value of the database object, a database user stature value of the database object, and a usage frequency value of the database object, and wherein the update frequency value relates to a rate of change of the database object, wherein the database user stature value relates to an organizational hierarchy of users that access the database object, and wherein the usage frequency value relates to a rate that the database object is queried;

based on the first subset of database object priority values being above a first threshold priority value, deploying the first subset of database objects on a first storage medium having a first access-factor;

in response to deploying the first subset of the set of database objects, a second subset of the set of database objects which corresponds with a second subset of the database object priority values that do not exceed the threshold priority value; and based on the second subset of database object priority values being below the first threshold priority value and above a second threshold priority value, deploying the second subset of database objects on a second storage medium having a second access-factor, wherein the second access-factor is lower than the first access-factor, and wherein an increase in access-factor corresponds an decrease in the time to access a subset of database objects.

2. The method of claim 1, wherein the set of database object profile data includes:
a set of user profile data for a set of users with respect to the set of database objects;
a set of update data for the set of database objects; and
a set of usage data for the set of database objects.

3. The method of claim 1 further comprising:
preventing maintenance of a second subset of the set of database objects which corresponds with a second subset of the database object priority values that do not exceed the threshold priority value.

4. The method of claim 1 further comprising:
preventing capture of a second set of statistics for a second subset of the set of database objects which corresponds with a second subset of the database object priority values that do not exceed the threshold priority value.

5. The method of claim 1, wherein the first data storage medium includes a solid-state drive, and wherein the second data storage medium includes a hard disk drive.

6. The method of claim 1, wherein the first data storage medium includes a local flash drive, and wherein the second data storage medium includes a remote hard disk drive.

7. The method of claim 1, wherein the collecting, the determining, and the performing each occur in an automated fashion without user intervention.

8. The method of claim 1, further comprising:
metering use of the database object management; and
generating an invoice based on the metered use.

9. A system of database object management for a shared pool of configurable computing resources, the system comprising:
a memory having a set of computer readable computer instructions, and
a processor for executing the set of computer readable instructions, the set of computer readable instructions including:
collecting a set of database object profile data for a set of database objects, wherein the set of database objects comprises a first subset of database objects and a second subset of database objects;
determining, based on the set of database object profile data, a first subset of database object priority values for the first subset of database objects and a second subset of database object priority values for the second subset of database objects, wherein the database object priority value is calculated based on a weighted summation of an update frequency value of the database object, a database user stature value of the database object, and a usage frequency value of the database object, and wherein the update frequency value relates to a rate of change of the database object, wherein the database user stature value relates to an organizational hierarchy of users that access the database object, and wherein the usage frequency value relates to a rate that the database object is queried;
based on the first subset of database object priority values being above a first threshold priority value, deploying the first subset of database objects on a first storage medium having a first access-factor;
in response to deploying the first subset of the set of database objects, a second subset of the set of database objects which corresponds with a second subset of the database object priority values that do not exceed the threshold priority value; and
based on the second subset of database object priority values being below the first threshold priority value and above a second threshold priority value, deploying the second subset of database objects on a second storage medium having a second access-factor, wherein the second access-factor is lower than the first access-factor, and wherein an increase in access-factor corresponds an decrease in the time to access a subset of database objects.

10. A computer program product of database object management for a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:
collecting a set of database object profile data for a set of database objects, wherein the set of database objects comprises a first subset of database objects and a second subset of database objects;
determining, based on the set of database object profile data, a first subset of database object priority values for the first subset of database objects and a second subset of database object priority values for the second subset of database objects, wherein the database object priority value is calculated based on a weighted summation of an update frequency value of the database object, a database user stature value of the database object, and a usage frequency value of the database object, and wherein the update frequency value relates to a rate of change of the database object, wherein the database user stature value relates to an organizational hierarchy of users that access the database object, and wherein the usage frequency value relates to a rate that the database object is queried;
based on the first subset of database object priority values being above a first threshold priority value, deploying the first subset of database objects on a first storage medium having a first access-factor;
in response to deploying the first subset of the set of database objects, a second subset of the set of database objects which corresponds with a second subset of the database object priority values that do not exceed the threshold priority value; and
based on the second subset of database object priority values being below the first threshold priority value and above a second threshold priority value, deploying the second subset of database objects on a second storage medium having a second access-factor, wherein the second access-factor is lower than the first access-factor, and wherein an increase in access-factor corresponds an decrease in the time to access a subset of database objects.

11. The computer program product of claim 10, wherein at least one of:
the program instructions are stored in a computer readable storage medium in a data processing system, and wherein the program instructions were downloaded over a network from a remote data processing system; or
the program instructions are stored in the computer readable storage medium in a server data processing system, and wherein the program instructions are downloaded over a network to the remote data processing system for use in the computer readable storage medium with the remote data processing system.

* * * * *